United States Patent [19]

Richardson et al.

[11] 4,113,269

[45] Sep. 12, 1978

[54] FENDER

[75] Inventors: Warner G. Richardson; Eugene M. Wilson, both of Joliet, Ill.

[73] Assignee: Caterpillar Tractor Co., Peoria, Ill.

[21] Appl. No.: 826,576

[22] Filed: Aug. 22, 1977

[51] Int. Cl.² .............................................. B62B 9/14
[52] U.S. Cl. ................................. 280/154.5 R; 293/1
[58] Field of Search ................. 293/1, 34, 36, DIG. 5, 293/DIG. 6; 280/152 R, 152 A, 152 B, 152.1, 152.2, 152.3, 153 R, 153 A, 153.5, 154.5 R, 154.5 A, 159; 298/156, 17 R

[56] References Cited

U.S. PATENT DOCUMENTS

| | | | |
|---|---|---|---|
| 1,811,112 | 6/1931 | Carton | 280/152 R |
| 2,809,848 | 10/1957 | Carswell | 280/154.5 R |

FOREIGN PATENT DOCUMENTS

| | | | |
|---|---|---|---|
| 368,678 | 2/1939 | Italy | 280/154.5 A |
| 44,811 | 1/1917 | Sweden | 280/154.5 A |
| 482,430 | 3/1938 | United Kingdom | 280/152.1 |

Primary Examiner—Trygve M. Blix
Assistant Examiner—Jesus D. Sotelo
Attorney, Agent, or Firm—John L. James

[57] ABSTRACT

A composite, movable fender includes first and second assemblies. The first assembly has a surface and an end portion and the second assembly has a working member. The second assembly is connected to the end portion of the first assembly and movable between first and second positions. The working member is spaced from the first assembly at the first position and the working member is supported by the first assembly surface at the second position.

5 Claims, 2 Drawing Figures

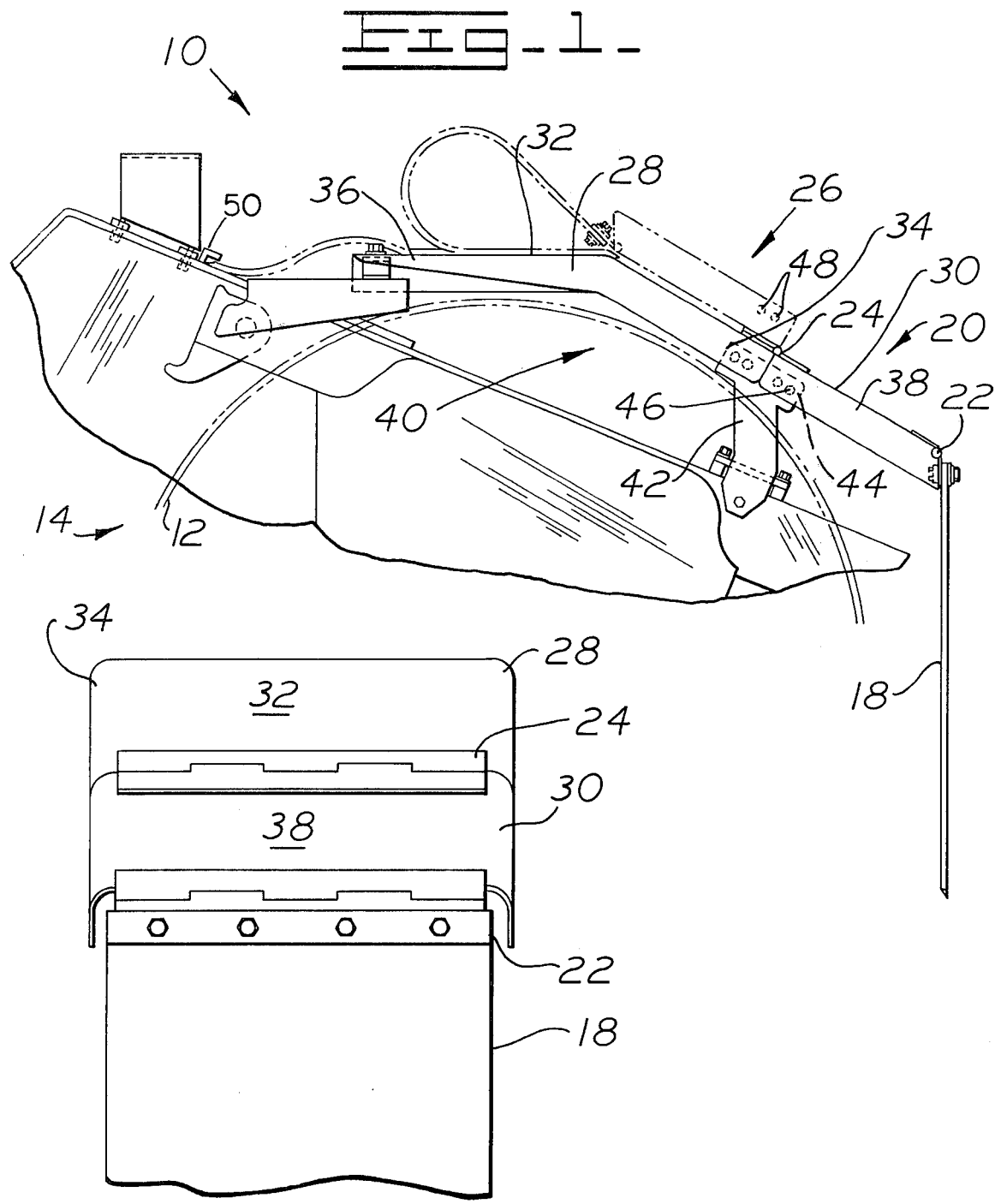

FENDER

BACKGROUND OF THE INVENTION

Vehicle fenders are typically welded or bolted together and mounted on the vehicle as a unit. The fender prevents foreign objects picked up by the vehicle wheel from being thrown from the vehicle. The fender is circumferentially positioned about the wheel and is susceptible to damage during a normal work cycle of the vehicle. This is particularly true for a tractor-scraper in which the wheel of the scraper sometimes contacts the fender or dirt rocks push the fender against the wheel. The entire fender is not normally needed during the work cycle, but fenders are bulky and time-consuming to remove.

It is desirable to have a fender which prevents objects from being thrown by the wheel and which can be easily moved or converted during a work cycle.

SUMMARY OF THE INVENTION

The present invention is directed to overcoming one or more of the problems as set forth above.

According to the present invention, a composite, movable fender portion includes first and second assemblies. The first assembly has a surface and an end portion and the second assembly has a working member. The second assembly is connected to the first assembly and movable relative to the first assembly between a first position at which the working member is spaced from the first assembly and a second position at which the working member is supported by the surface of the first assembly. Means are provided for maintaining the second assembly in a selected one of the first and second positions.

BRIEF DESCRIPTION OF THE DRAWINGS

FIG. 1 is a diagrammatic side view of the present invention; and

FIG. 2 is a diagrammatic front view of the present invention.

DETAILED DESCRIPTION

Referring to FIGS. 1 and 2, a fender assembly 10 extends in a circumferentially spaced relation about a rotatable wheel 12 of a vehicle 14, such as a tractor-scraper, for example. The fender assembly 10 preferably includes a generally flexible working member 18 and means 20 for movably connecting the working member to the fender assembly 10.

The working member 18 is movable between a first position at which the working member 18 is generally pendantly connected to the fender assembly 10 and extends in spaced relation behind the wheel 12 and a second position at which the working member 18 extends generally along and in contact with the fender assembly 10.

The connecting means 20 preferably includes first and second connected hinges 22, 24 (FIG. 2). The first hinge 22 is connected to the working member 18 and the second hinge 24 is connected to the fender assembly 10.

The fender assembly 10 preferably includes a composite, movable fender portion 26 which has first and second assemblies 28, 30. The first assembly 28 has a surface 32 and first and second end portions 34, 36.

The second assembly 30 preferably includes a support member 38 which is connected to the working member 18 by hinge 22 and the first end portion 34 of the first assembly 28 by hinge 24. The second assembly 30 is movable relative to the first assembly 28 between a first position at which the working member 18 is spaced from the first assembly 28 and a second position at which the working member 18 is supported by the surface 32 of the first assembly 28. The first position is shown in solid lines in FIG. 1 and the second position is shown in broken lines. The working member 18 can be looped and tucked under the support member 38.

The fender assembly 10 includes means 40 for maintaining the second assembly 30 in a selected one of the first and second positions. The maintaining means 40 preferably includes a support bracket 42 which has at least one opening 44 and a pin 46 or bolt insertable in the opening 44. The opening 44 is alignable with a support member opening 48 and the pin 46 is insertable in both openings 44, 48 at the first position of the second assembly 30. The support bracket 42 maintains the working member 18 a preselected distance from the wheel 12.

The first and second assemblies 28, 30 preferably have U-shaped cross-sections. The second assembly support member 38 preferably has a construction sufficient for urging against the first assembly surface 32 and urging the working member 18 toward the first assembly surface 32 in response to the second assembly 30 being at the second position.

The working member 18 is movable about the first hinge 22 generally toward and from the support member 38. The support member 38 is movable about the second hinge 24 generally toward and from the first assembly 28.

The maintaining means 40 preferably includes a maintaining bracket 50 connected to the fender assembly 10. The maintaining bracket 50 is of a construction sufficient for insertion of a portion of the working member 18 between the maintaining bracket 50 and first assembly surface 32.

In operation, the second assembly 30 is changed from the first position to the second position by removing the pin 46 and folding the working member 18 and support member 38 toward the first assembly 28. The weight of the support member 38 maintains the support member 38 and working member 18 in position. A portion of the working member 18 is tucked between the maintaining bracket 50 and first assembly surface 32.

In the first position, the working member 18 functions as a fender flap to intercept objects thrown by the wheel. The working member 18 is easily moved to the second position during a working cycle.

Other aspects, objects and advantages will become apparent from a study of the specification, drawings and appended claims.

The embodiments of the invention in which an exclusive property or privilege is claimed are defined as follows:

1. A composite, movable fender portion comprising:
   a first assembly having a surface and first and second end portions;
   a second assembly having a working member and being connected to the first assembly and movable relative to the first assembly between a first position at which the working member is spaced from the first assembly and a second position at which the working member is supported by the surface of the first assembly; and
   means for maintaining the second assembly in a selected one of the first and second positions, said maintaining means including a stationary support bracket having an opening, and a pin insertable in said opening, said opening being alignable with an opening in the second assembly at the first position of said second assembly, said support bracket supporting the second assembly through said pin and said openings at only the first position and continuously supporting the first assembly.

2. An apparatus, as set forth in claim 1, including a hinge connected to the first end portion of the first assembly and to the second assembly in opposed relation to the working member, said second assembly being movable about the hinge generally toward and from the first assembly.

3. An apparatus, as set forth in claim 1, wherein the second assembly includes a support member and a hinge, said hinge being connected to the support member and working member, said working member being movable about said hinge generally toward and from the support member.

4. An apparatus, as set forth in claim 1, wherein said maintaining means includes a second assembly support member having a construction sufficient for urging against the first assembly surface and urging the working member toward the first assembly surface in response to the second assembly being at the second position.

5. An apparatus, as set forth in claim 1, wherein the maintaining means includes a maintaining bracket connected to the first assembly and being of a construction sufficient for insertion of a portion of the working member between the bracket and first assembly.

* * * * *